(12) United States Patent
Oyama

(10) Patent No.: US 10,313,580 B2
(45) Date of Patent: Jun. 4, 2019

(54) ELECTRONIC APPARATUS, CONTROL METHOD THEREFOR, AND STORAGE MEDIUM

(71) Applicant: CANON KABUSHIKI KAISHA, Tokyo (JP)

(72) Inventor: Yasufumi Oyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/683,538

(22) Filed: Aug. 22, 2017

(65) Prior Publication Data

US 2018/0063418 A1 Mar. 1, 2018

(30) Foreign Application Priority Data

Aug. 30, 2016 (JP) ................................. 2016-168607

(51) Int. Cl.
| | |
|---|---|
| *G06F 3/00* | (2006.01) |
| *G06F 3/041* | (2006.01) |
| *H04N 5/232* | (2006.01) |
| *G06F 3/0488* | (2013.01) |

(52) U.S. Cl.
CPC ......... *H04N 5/23216* (2013.01); *G06F 3/005* (2013.01); *G06F 3/041* (2013.01); *G06F 3/0412* (2013.01); *G06F 3/0416* (2013.01); *G06F 3/0488* (2013.01); *G06F 3/04883* (2013.01); *G06F 3/04886* (2013.01); *H04N 5/23212* (2013.01); *H04N 5/23293* (2013.01); *G06F 2203/04808* (2013.01)

(58) Field of Classification Search
CPC ........... H04N 5/23212; H04N 5/23293; H04N 5/23216; G06F 3/0412; G06F 3/0488
See application file for complete search history.

(56) References Cited

FOREIGN PATENT DOCUMENTS

JP 2012-203143 A 10/2012

*Primary Examiner* — Charles V Hicks
(74) *Attorney, Agent, or Firm* — Canon USA, Inc., IP Division

(57) ABSTRACT

An electronic apparatus includes a touch detection unit that detects a touch operation on an operation surface including a first region, a third region, and a second region adjacent to one another, and a control unit that performs control, when a touch position is moved in the first region, to move a mark, which is displayed on a display unit different from the operation surface, based on a first component and a second component of movement of the touch position, not move the mark displayed on the display unit even when the touch position is moved in the second region, and not move the mark displayed on the display unit based on at least one of the first component and the second component of movement of the touch position when the touch position is moved in the third region.

25 Claims, 6 Drawing Sheets

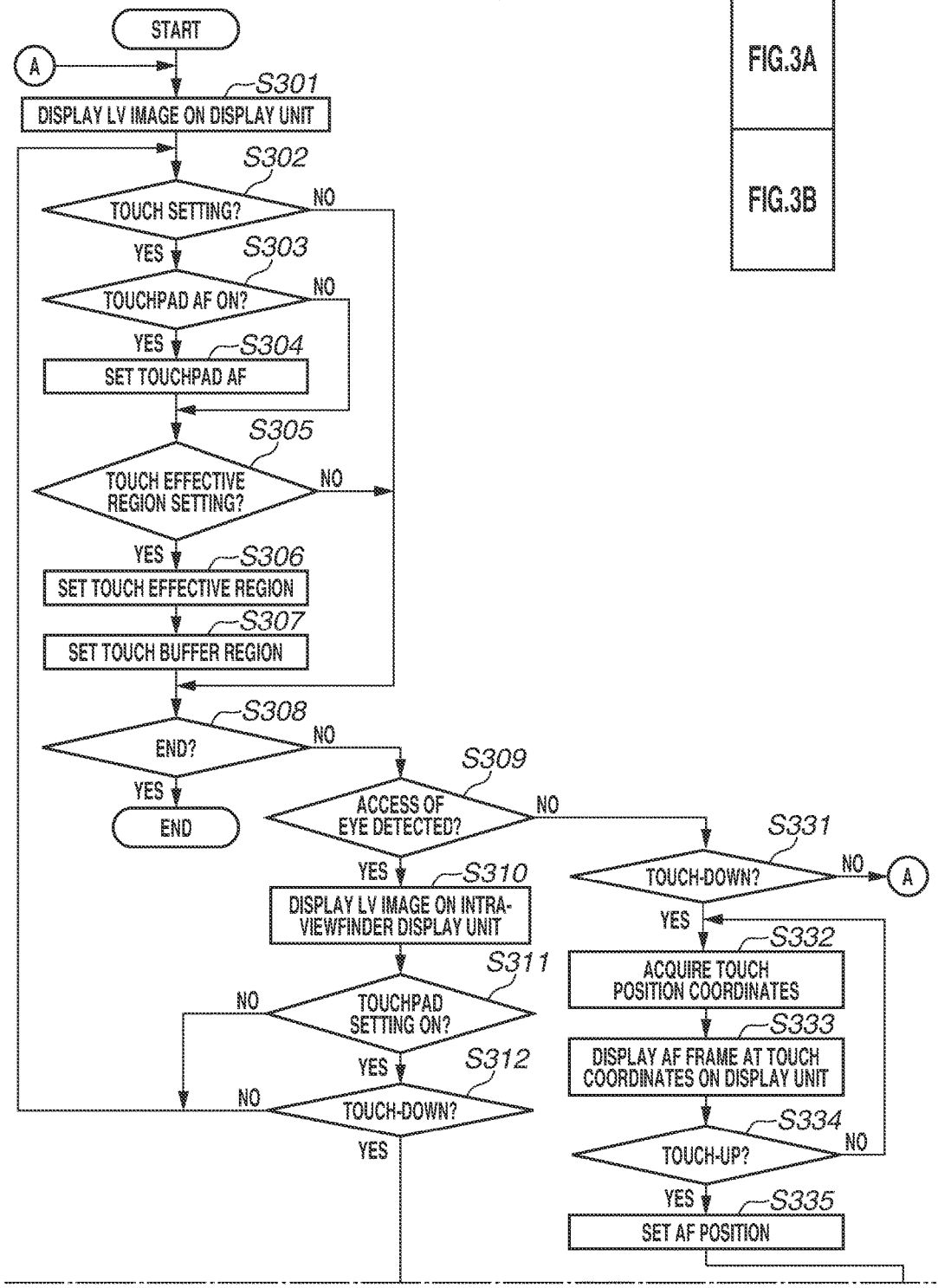

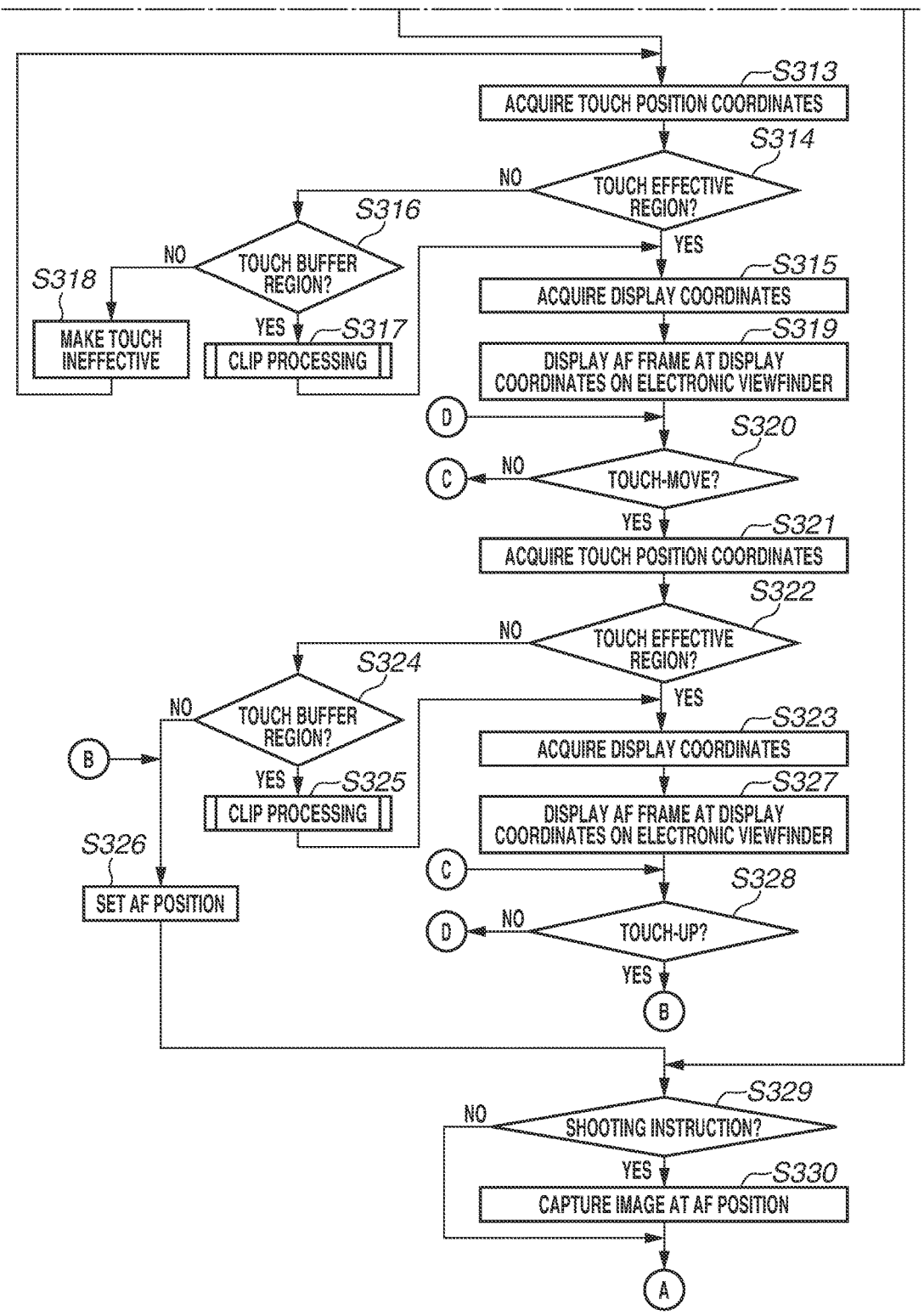

ELECTRONIC APPARATUS, CONTROL METHOD THEREFOR, AND STORAGE MEDIUM

BACKGROUND

Field

Aspects of the present disclosure generally relate to an electronic apparatus and a control method therefor and, more particularly, to a technique to determine a position according to a touch operation.

Description of the Related Art

Recently, there has been proposed a method of, when performing a touch operation, operating a touch panel mounted at a position different from that of a display unit that the user is viewing. Japanese Patent Application Laid-Open No. 2012-203143 discusses that the user can change an autofocus (AF) position by performing a touch operation on a back-side monitor while looking through a display unit in a viewfinder and that, if the user slides the touch position to outside the end of the back-side monitor, the AF position is initialized.

When operating the touch panel while looking through the display unit in the viewfinder, the user is viewing the display unit in the viewfinder and is, therefore, not able to easily recognize where the user is touching on the touch panel. In other words, in the case of performing a touch operation while looking through the viewfinder, the user is not able to easily and accurately recognize the current touch point, so that the user can unintentionally move the touch position to a position in which a touch is ineffective. At this time, if the AF position is initialized as discussed in Japanese Patent Application Laid-Open No. 2012-203143, since the user unintentionally moved the touch position to an ineffective region, setting or processing unintended by the user can be performed.

SUMMARY

Aspects of the present disclosure are generally directed to reducing the possibility of unintended processing being performed due to the touch position moving to a touch ineffective region.

According to an aspect of the present invention, an electronic apparatus includes a touch detection unit configured to detect a touch operation on an operation surface, the operation surface including a first region, a third region adjacent to the first region, and a second region adjacent to the third region, and a control unit configured to perform control, when a touch position is moved in the first region, to move a mark, which is displayed on a display unit different from the operation surface, based on a first component and a second component of movement of the touch position, not move the mark displayed on the display unit even when the touch position is moved in the second region of the operation surface, and not move the mark displayed on the display unit based on at least one of the first component and the second component of movement of the touch position when the touch position is moved in the third region.

Further features will become apparent from the following description of exemplary embodiments with reference to the attached drawings.

BRIEF DESCRIPTION OF THE DRAWINGS

FIG. 3, which is composed of FIGS. 3A and 3B, is a flowchart illustrating shooting mode processing in the exemplary embodiment.

DESCRIPTION OF THE EMBODIMENTS

Various exemplary embodiments, features, and aspect will be described in detail below with reference to the drawings.

Figure 1A:
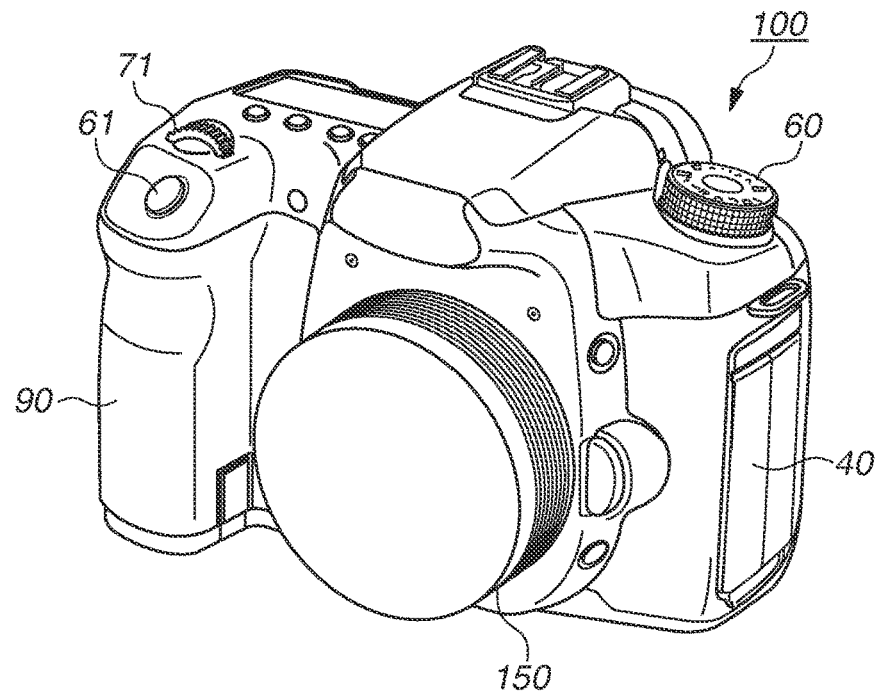
FIGS. 1A and 1B are appearance diagrams illustrating an example of an apparatus to which a configuration of an exemplary embodiment is applicable.
Figure 1B:
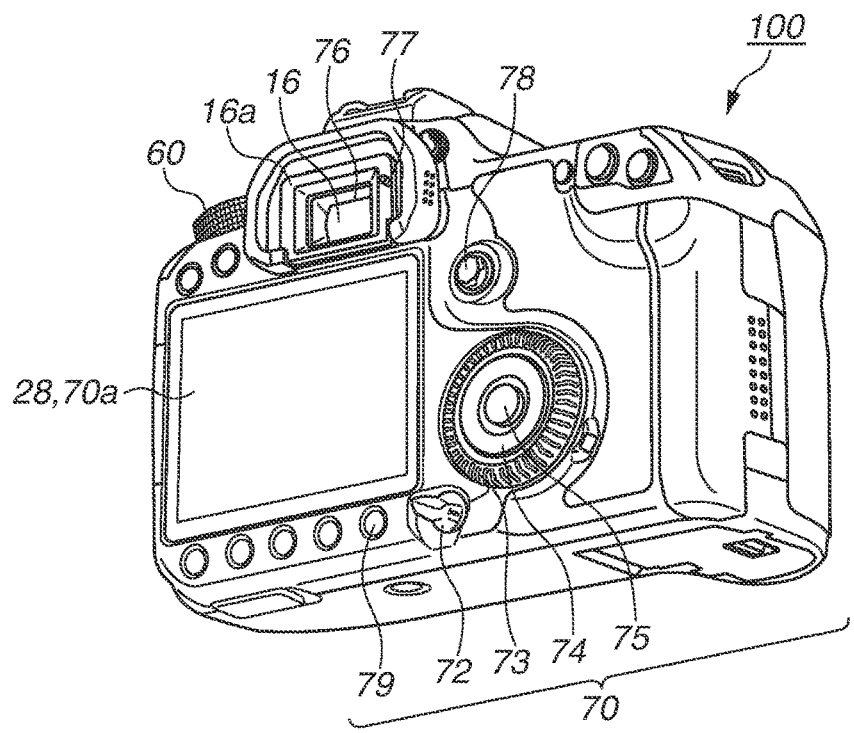

FIGS. 1A and 1B illustrate external views of a digital camera 100 serving as an example of an electronic apparatus to which an exemplary embodiment is applicable. FIG. 1A is a front perspective view of the digital camera 100, and FIG. 1B is a rear perspective view of the digital camera 100. A display unit 28, which displays images and various pieces of information, is integrally provided with a touch panel 70a, which can receive a touch operation (capable of detecting a touch), serving as an operation surface. The display unit 28, which is typically a back-side monitor used to display an image, can by any type of display, e.g., liquid crystal type, organic electroluminescence (EL) type, as long as it can display an image.

A shutter button 61 is an operation unit operable to issue a shooting instruction. A mode changeover switch 60 is an operation unit operable to change over (switch) various modes. A terminal cover 40 is a cover that protects a connector (not illustrated), such as a connection cable that connects an external apparatus and the digital camera 100. A main electronic dial 71 is a rotary operation member included in an operation unit 70, and the main electronic dial 71 is rotatable to, for example, change setting values, such as a shutter speed and an aperture value.

A power switch 72 is an operation member that switches ON and OFF of the power of the digital camera 100. A sub-electronic dial 73 is a rotary operation member included in the operation unit 70, and is used to move a selection frame or to feed images. Arrow keys 74, which are included in the operation unit 70, are arrow keys (four direction keys) upper, lower, left-side, and right-side portions of which are independently pushable. An operation corresponding to the pushed portion of the arrow keys 74 is selected to be performed.

A SET button 75, which is included in the operation unit 70, is a push button and is mainly used to, for example, determine a selection item. A live view (LV) button 78, which is included in the operation unit 70, is a button used to switch between ON and OFF of live view (hereinafter referred to as "LV") display of the display unit 28 when a still image shooting mode is selected. When a moving image shooting mode is selected, the LV button 78 is used to start and stop a moving image shooting (recording) operation.

A playback button 79, which is included in the operation unit 70, is an operation button used to switch between a shooting mode and a playback mode. When the playback button 79 is pushed during the shooting mode, the digital camera 100 shifts to the playback mode, thus causing the latest image from among images recorded on a recording medium 200 to be displayed on the display unit 28. A grip portion 90 is a holding portion (a grip portion) used to perform an operation while holding the digital camera 100, and the operation unit 70 is provided at the side of the grip portion 90.

When looking through a viewfinder 16, the user can view a subject displayed on an intra-viewfinder display unit 76, which is an electronic viewfinder (EVF). An eyepiece sensor 77 is an object detection unit (an access detection unit) configured to detect access of an object to a position at a distance shorter than a predetermined distance (within a predetermined distance), such as 1 cm or 2 cm. For example, when a user brings the user's eye closer to the viewfinder 16 (looks through an eyepiece portion 16a) and, then, the eyepiece sensor 77 detects access of an object (the eye), displaying is switched from the display unit 28 to the intra-viewfinder display unit 76, so that the user can view the behavior of the imaging subject.

When the eyepiece sensor 77 detects that the object (the eye) has moved away by the predetermined distance or more, displaying of, for example, items on the intra-viewfinder display unit 76 is turned off, and displaying is switched to the display unit 28. When the user looks through the viewfinder 16, displaying on the display unit 28 (an extra-viewfinder display unit) is turned off, but a touch operation performed on the touch panel 70a to, for example, set an AF position can be received. The AF position refers to the position of a subject on which to perform AF processing.

An item or mark indicating a position on which to perform specific processing other than the AF processing can also be displayed on the intra-viewfinder display unit 76. At this time, when the user performs a touch operation on the touch panel 70a while holding the grip portion 90 and keeping the user's finger on the shutter button 61, the user is able to promptly perform an operation for movement of the AF position and a shooting instruction while viewing displaying on the intra-viewfinder display unit 76. Displaying on the viewfinder 16 can be performed with an optical viewfinder (OVF) instead of an EVF. A lens unit 150 is a lens section that is detachable from the digital camera 100.

Figure 2:
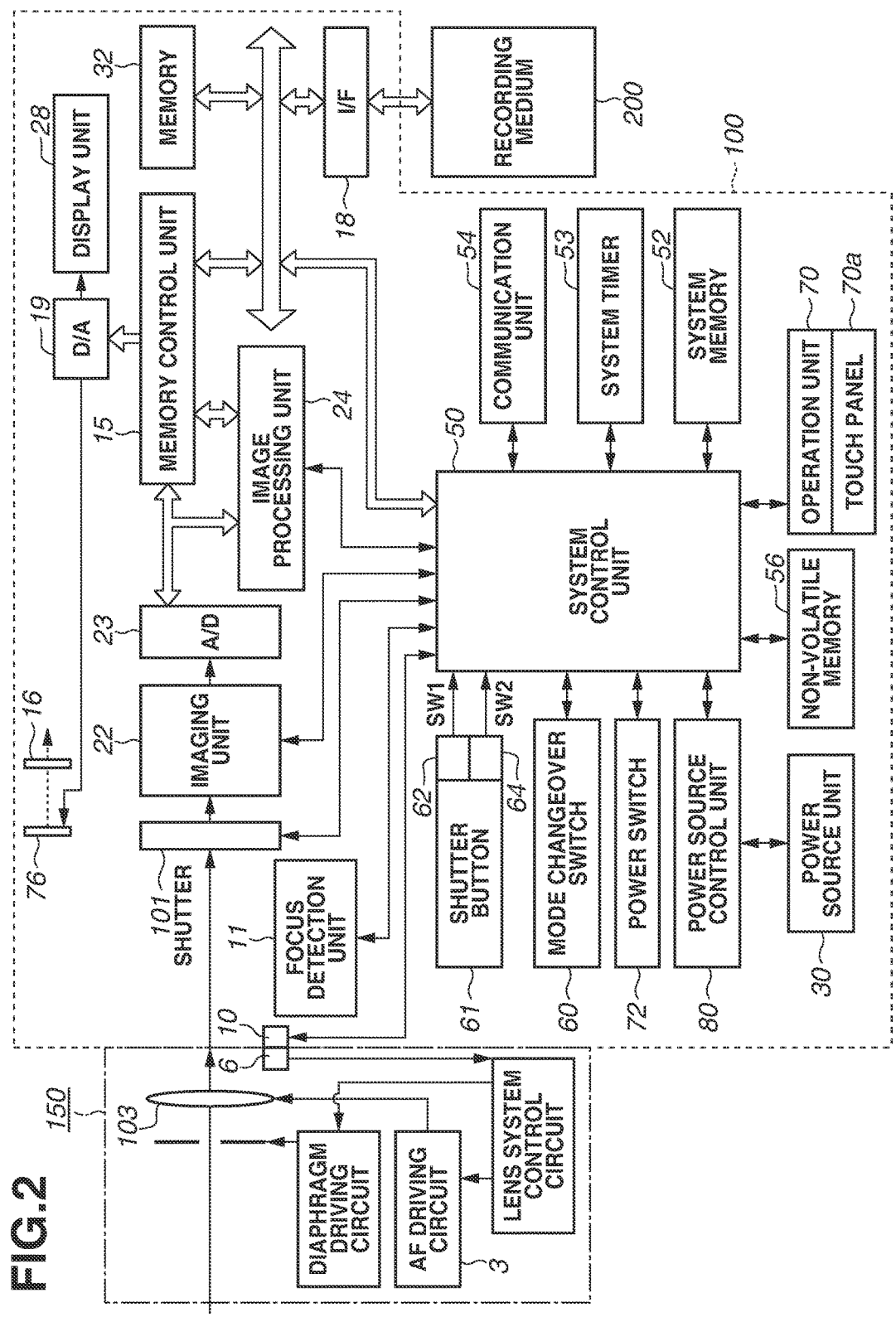
FIG. 2 is a block diagram illustrating a configuration example of a digital camera serving as an example of the apparatus to which the configuration of the exemplary embodiment is applicable.

FIG. 2 is a block diagram illustrating a configuration example of the digital camera 100 according to the present exemplary embodiment.

Referring to FIG. 2, the lens unit 150 is a lens unit including an interchangeable photographic lens mounted therein. A lens 103 is typically composed of a plurality of lenses, but is illustrated here as only a single lens for ease of description. A communication terminal 6 is used for the lens unit 150 to perform communication with the digital camera 100, and a communication terminal 10 is used for the digital camera 100 to perform communication with the lens unit 150.

The intra-viewfinder display unit 76 is a display unit that is located in such way as to be viewable through the viewfinder 16 (a viewfinder unit). When looking through the viewfinder 16, the user can confirm, for example, a frame indicating the AF position on the intra-viewfinder display unit 76 and icons (for example, items, marks, and signs) representing the setting state of the digital camera 100. The AF frame is displayed at a region of the subject available for AF processing on the intra-viewfinder display unit 76. Since the AF frame is displayed while being superimposed on a live view image, the user is able to easily recognize a subject on which to perform AF processing.

A focus detection unit 11 (an AF sensor) is an AF sensor of the phase difference detection type, which outputs defocus amount information to a system control unit 50 based on a captured image. The system control unit 50, which controls the lens unit 150 via the communication terminals 6 and 10, performs phase-difference AF by changing the position of the lens 103 based on the defocus amount information via an AF driving circuit 3 (able to perform AF). The method of AF does not need to be phase-difference AF, but can be contrast AF. The phase-difference AF can be performed, without using the focus detection unit 11, based on a defocus amount detected at the imaging plane of an imaging unit 22 (imaging plane phase-difference AF).

The imaging unit 22 is an image sensor composed of, for example, a charge-coupled device (CCD) sensor or a complementary metal-oxide semiconductor (CMOS) sensor, which converts an optical image into an electrical signal. An analog-digital (A/D) converter 23 converts an analog signal into a digital signal. The A/D converter 23 is used to convert an analog signal output from the imaging unit 22 into a digital signal.

An image processing unit 24 performs predetermined resizing processing, such as pixel interpolation or reduction, or color conversion processing on data output from the A/D converter 23 or data output from a memory control unit 15. The image processing unit 24 performs predetermined arithmetic processing using the captured image data, and the system control unit 50 performs exposure control and distance measuring (focusing) control based on a result of the arithmetic processing obtained by the image processing unit 24. This enables performing autofocus (AF) processing of the through-the-lens (TTL) type, automatic exposure (AE) processing, and electronic flash pre-emission (EF) processing. The image processing unit 24 also performs predetermined arithmetic processing using the captured image data, as well as automatic white balance (AWB) processing of the TTL type based on a result of the predetermined arithmetic processing.

Output data from the A/D converter 23 is written into a memory 32 via the image processing unit 24 and the memory control unit 15 or directly via the memory control unit 15. The memory 32 stores image data obtained by the imaging unit 22 and converted into digital data by the A/D converter 23 and image data to be displayed on the display unit 28. The memory 32 has a sufficient storage capacity to store a predetermined number of still images or a moving image and sound of a predetermined duration. The memory 32 also serves as a memory for image display (video memory).

A digital-analog (D/A) converter 19 converts data for image display stored in the memory 32 into an analog signal and supplies the analog signal to the display unit 28 or the intra-viewfinder display unit 76. In this way, the image data for display written in the memory 32 is displayed by the display unit 28 via the D/A converter 19. The display unit 28 provides a display corresponding to the analog signal from the D/A converter 19 on a display device, such as a liquid crystal display (LCD). The digital signal, which is a signal once subjected to A/D conversion by the A/D converter 23 and accumulated in the memory 32, is converted into an analog signal by the D/A converter 19. Then, the analog signal is sequentially transferred to the display unit 28 (in the case of displaying on the intra-viewfinder display unit 76, to the intra-viewfinder display unit 76), so that through-image display (live view display) can be performed.

A non-volatile memory 56 is an electrically erasable and recordable memory, and can be, for example, an electrically erasable programmable read-only memory (EEPROM). The non-volatile memory 56 stores, for example, constants and programs used for operation of the system control unit 50. The programs as used herein refer to programs for executing various flowcharts described below in the present exemplary embodiment.

The system control unit 50 controls the digital camera 100. The system control unit 50 implements processing operations described below in the present exemplary embodiment by executing the above-mentioned programs recorded in the non-volatile memory 56. A system memory 52 is a random access memory (RAM), which enables, for example, constants and variables used for operation of the system control unit 50 and programs read from the non-volatile memory 56 to be loaded thereon. The system control unit 50 also performs display control by controlling, for example, the memory 32, the D/A converter 19, the display unit 28, and the intra-viewfinder display unit 76.

A system timer 53 is a time measurement unit, which measures times used for various control operations and the time of a built-in clock. The mode changeover switch 60, the shutter button 61, and the operation unit 70 serve as an operation unit used to input various operation instructions to the system control unit 50.

The mode changeover switch 60 changes over the operation mode of the system control unit 50 to any one of, for example, a shooting mode and a playback mode. The operation mode further includes, for example, various scene modes for shooting settings for respective different shooting scenes, a program AE mode, and a custom mode. The mode changeover switch 60 is used to directly change over the operation mode to any one of these modes included in a menu screen. Alternatively, after a menu screen is once selected and displayed, the operation mode can be changed over to any one of these modes included in the menu screen using another operation member.

A first shutter switch 62 is turned on by a halfway operation, in other words, a half press (a shooting preparation instruction), of the shutter button 61 provided on the digital camera 100, thus generating a first shutter switch signal SW1. The first shutter switch signal SW1 is used to start operations including, for example, autofocus (AF) processing, automatic exposure (AE) processing, automatic white balance (AWB) processing, and electronic flash pre-emission (EF) processing.

A second shutter switch 64 is turned on by a complete operation, in other words, a full press (a shooting instruction), of the shutter button 61, thus generating a second shutter switch signal SW2. In response to the second shutter switch signal SW2, the system control unit 50 starts a series of shooting processing operations performed from the time of signal readout from the imaging unit 22 to the time of writing of image data to the recording medium 200.

Operation members of the operation unit 70 are assigned the respective functions as appropriate according to various scenes by selection and operation of various function icons displayed on the display unit 28, thus functioning as various function buttons. The operation unit 70 includes at least the following operation members: the shutter button 61, the main electronic dial 71, the power switch 72, the sub-electronic dial 73, the arrow keys 74, the SET button 75, the LV button 78, and the playback button 79. The user can intuitively perform various setting operations using a menu screen displayed on the display unit 28, four-direction (up, down, right, and left) buttons, and a SET button.

A power source control unit 80 is composed of, for example, a battery detection circuit, a direct current (DC)-DC converter, and a switch circuit that changes over a block to be energized, and detects the presence or absence of loading of a battery, the type of a battery, and the remaining amount of a battery. The power source control unit 80 controls the DC-DC converter based on results of such detection and an instruction from the system control unit 50, and supplies, to various units including the recording medium 200, required voltages for required periods. The power switch 72 receives a changeover operation between ON and OFF of the power source.

A power source unit 30 is composed of, for example, a primary battery, such as alkaline battery or lithium battery, a secondary battery, such as nickel-cadmium (NiCd) battery, nickel-metal hydride (NiMH) battery, or lithium (Li) battery, and an alternating-current (AC) adapter. A recording medium interface (I/F) 18 is an interface with the recording medium 200, such as a memory card or a hard disk. The recording medium 200 is a recording medium, such as a memory card, used to record captured images, and is composed of, for example, a semiconductor memory or a magnetic disk.

A communication unit 54 performs connection wirelessly or by a wired cable to transmit and receive video signals and audio signals. The communication unit 54 connects to a wireless local area network (LAN) or the Internet. The communication unit 54 transmits an image captured by the imaging unit 22 (including a through-image) or an image recorded on the recording medium 200, and receives image data or other various pieces of information from an external apparatus (having a receiving function).

One operation member of the operation unit 70 includes the touch panel 70a, which is able to detect contact with the display unit 28. The touch panel 70a and the display unit 28 can be integrally configured. For example, the touch panel 70a is configured in such a way that the transmittance for light thereof does not disturb displaying by the display unit 28, and is fixed onto the upper layer of the display surface of the display unit 28. The input coordinates on the touch panel 70a are associated with the corresponding display coordinates on the display unit 28. This enables configuring a graphical user interface (GUI) in such a manner that the user can directly operate a screen displayed on the display unit 28. In this way, setting for receiving an instruction while associating a position at which a touch operation has been performed and a position on the display unit 28 with each other is referred to as "absolute coordinate setting".

Unlike the absolute coordinate setting, setting for receiving an instruction on a position to which a touch operation has moved according to, for example, an amount of movement thereof and a direction of movement thereof from a predetermined position on the display unit 28 (a position moved by an amount corresponding to a moving operation), rather than the coordinates of a position at which the touch operation has been performed, is referred to as "relative coordinate setting".

In the case of performing an operation while viewing the intra-viewfinder display unit 76, when performing a touch operation in the absolute coordinate setting, the user would touch the touch panel 70a (the display unit 28) without viewing the touch panel 70a, so that the user could erroneously perform a touch operation on a position deviating from an intended position. When performing a touch operation in the relative coordinate setting, since a movement instruction is given with an amount of movement instead of the position, the user can issue an instruction on an intended position by performing an operation to move to the intended position while viewing the position of an operation object displayed on the intra-viewfinder display unit 76. The absolute coordinate setting and the relative coordinate setting are settable via a touchpad setting in the menu screen.

In the case of the relative coordinate setting, if the user performs an operation while viewing the display unit 28, since the touch position and the intended position can differ from each other, operability may not be good. Therefore, if such a configuration as to accept a touch operation in the relative coordinate setting when the eyepiece sensor 77 (an access detection sensor) detects access of an object is employed, operability is good in both cases where the user is viewing the display unit 28 and where the user is viewing the intra-viewfinder display unit 76. The function of the touch panel 70a to receive a touch operation while no image is displayed on the display unit 28 is referred to as a "touchpad function".

The system control unit 50 can detect the following operations or states on the touch panel 70a:
- the state in which a finger or stylus, which has not been touching the touch panel 70a, touches the touch panel 70a. In other words, starting of a touch (hereinafter referred to as "touch-down").
- the state in which a finger or stylus is touching the touch panel 70a (hereinafter referred to as "touch-on").
- the state in which a finger or stylus is moving while touching the touch panel 70a (hereinafter referred to as "touch-move").
- the state in which a finger or stylus, which has been touching the touch panel 70a, is removed from the touch panel 70a. In other words, ending of a touch (hereinafter referred to as "touch-up").
- the state in which nothing is touching the touch panel 70a (hereinafter referred to as "touch-off").

When "touch-down" is detected, "touch-on" is detected at the same time. After "touch-down", unless "touch-up" is detected, "touch-on" normally continues being detected. "Touch-move" is also detected in the state in which "touch-on" is detected. Even if "touch-on" is detected, unless the touch position is not moving, "touch-move" is not detected. After "touch-up" of all fingers or the stylus touching the touch panel 70a is detected, "touch-off" is detected.

Information on these operations or states and the coordinates of a position at which a finger or stylus is touching the touch panel 70a is transmitted to the system control unit 50. The system control unit 50 then determines how an operation has been performed on the touch panel 70a based on the transmitted information. With regard to "touch-move", the system control unit 50 can also detect the direction of movement of a finger or stylus moving on the touch panel 70a for each of a vertical component and a horizontal component on the touch panel 70a based on a change of the position coordinates.

A series of operations performed from detection of "touch-on" to prompt "touch-up" without "touch-move" is referred to as a "tap". The operation performed from "touch-down" to "touch-up" via predetermined "touch-move" on the touch panel 70a is referred to as "drawing a stroke". The operation of quickly drawing a stroke is referred to as "flick". The flick is an operation of quickly moving a finger/stylus a certain degree of distance while keeping the finger/stylus touching the touch panel 70a and then directly separating the finger/stylus from the touch panel 70a. In other words, an operation of quickly tracing the surface of the touch panel 70a as if flicking the touch panel 70a with the finger/stylus.

When "touch-move" performed a predetermined distance or more at a predetermined speed or higher is detected and "touch-up" is then detected, it is determined that flick has been performed. When "touch-move" performed a predetermined distance or more at lower than a predetermined speed is detected, it is determined that drag has been performed.

The touch panel 70a can be any type of touch panel selected from among touch panels of various types including, for example, the resistance film type, the capacitance type, the surface acoustic wave type, the infrared ray type, the electromagnetic induction type, the image recognition type, or the optical sensor type. Among these types, there are a type that detects that touch has been performed based on contact with the touch panel and a type that detects that touch has been performed based on access of a finger or stylus to the touch panel, and any one of the two types can be employed.

Next, shooting mode processing in the present exemplary embodiment is described with reference to FIG. 3, which is composed of FIGS. 3A and 3B. This processing is implemented by the system control unit 50 loading a program recorded on the non-volatile memory 56 into the system memory 52 and executing the program. This processing starts when the digital camera 100 is powered on and the shooting mode is selected.

In step S301, the system control unit 50 displays a live view image (an LV image or a through-image) on the display unit 28. In step S302, the system control unit 50 determines whether touch setting, which is performed to make setting concerning a touch operation, has been selected in the menu screen. The menu screen is displayed in response to pressing of the menu button, and, when touch operation setting is selected in the menu screen, the touch setting becomes selectable. The touch setting is available to select whether to enable AF setting change (touch and drag AF), which is performed by a touch operation during viewfinder access, whether to set a position specifying method to the absolute coordinate setting or the relative coordinate setting, and where to set a touch effective region. The touch effective region is selectable from among the entirety, right, left, upper right, upper left, lower right, and lower left areas (effective region setting).

In step S303, the system control unit 50 determines whether setting has been performed to enable the AF setting change that is performed by a touch operation during viewfinder access in the touch setting. If it is determined that setting has been performed to enable (turn on) the AF setting change that is performed by a touch operation during viewfinder access (YES in step S303), the processing proceeds to step S304. If not (NO in step S303), the processing proceeds to step S305.

In step S304, the system control unit 50 enables the AF setting change that is performed by a touch operation during viewfinder access. When the user looks through the viewfinder 16, the display unit 28 is turned off in display function, and an LV image is displayed on the intra-viewfinder display unit 76. If the AF setting change that is performed by a touch operation during viewfinder access is enabled, the user can set the AF position by performing a touch operation on the display unit 28 (the touch panel 70a). Therefore, when enabling the AF setting change that is performed by a touch operation during viewfinder access, while no display is made on the display unit 28, the user can set the AF position with good operability while looking through the viewfinder 16.

In step S305, the system control unit 50 determines whether touch effective region setting has been changed. In the present exemplary embodiment, the touch panel 70a is divided into a touch effective region, a touch buffer region, and a touch ineffective region (excluding the overall setting). The touch buffer region and the touch ineffective region are determined according to the range of the touch effective region, and the touch buffer region is a region including at least a region of the boundary (a region sandwiched) between the touch effective region and the touch ineffective region and that is set in such a way as to surround the touch effective region.

The system control unit 50, in step S305, determines whether an operation of changing the setting of the size and position of the touch effective region on the touch panel 70a has been performed. The touch effective region setting is selectable from among seven patterns, i.e., the entirety of the touch panel 70a, right half, left half, upper right, upper left, lower right, and lower left areas. However, divisions such as the entirety, right half, and left half are not necessarily the ones that correctly indicate the areas of the touch panel 70a, but the ones that indicate the areas in such a way as to be easily understandable by the user. If it is determined that the touch effective region setting has been changed (YES in step S305), the processing proceeds to step S306. If not (NO in step S305), the processing proceeds to step S308.

In step S306, the system control unit 50 sets a touch effective region obtained as a result of the change of the touch effective region setting performed by an operation of the user determined in step S305. A relationship between the touch effective region and the intra-viewfinder display unit 76 is described with reference to FIGS. 5A, 5B, 5C, and 5D.

Figure 5A:
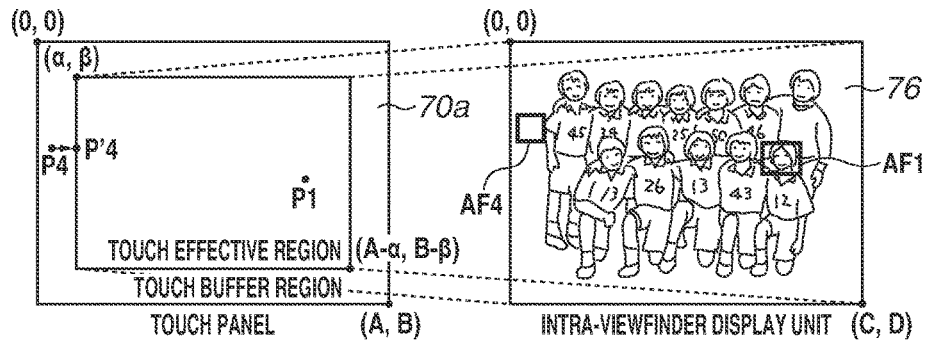
FIGS. 5A, 5B, 5C, and 5D illustrate behaviors of touch positions on a touch panel and a display unit in the exemplary embodiment.

FIG. 5A illustrates a case where the touch effective region has been changed to the entirety in step S305, in which the touch effective region (($\alpha$, $\beta$) to (A–$\alpha$, B–$\beta$)) corresponds to a region ((0, 0) to (C, D)) of the intra-viewfinder display unit 76. More specifically, during the absolute coordinate setting, in a case where the touch input coordinates are ($\alpha$, $\beta$), the coordinates of the intra-viewfinder display unit 76 become (0, 0), and, in a case where the touch input coordinates are (A–$\alpha$, B–$\beta$), the coordinates of the intra-viewfinder display unit 76 become (C, D). During the absolute coordinate setting, when a touch operation is performed in the touch effective region, an AF frame is displayed at the coordinates of the intra-viewfinder display unit 76 corresponding to the touch input coordinates. During the relative coordinate setting, while the touch input coordinates do not correspond to the coordinates of the intra-viewfinder display unit 76, the display position of the AF frame moves based on the movement of the touch position in the touch effective region. When the touch input coordinates move by a distance K in the X-axis direction in the touch effective region, an AF frame on the intra-viewfinder display unit 76 moves by $K \times (C/(A-\alpha-\alpha))$.

Figure 5B:
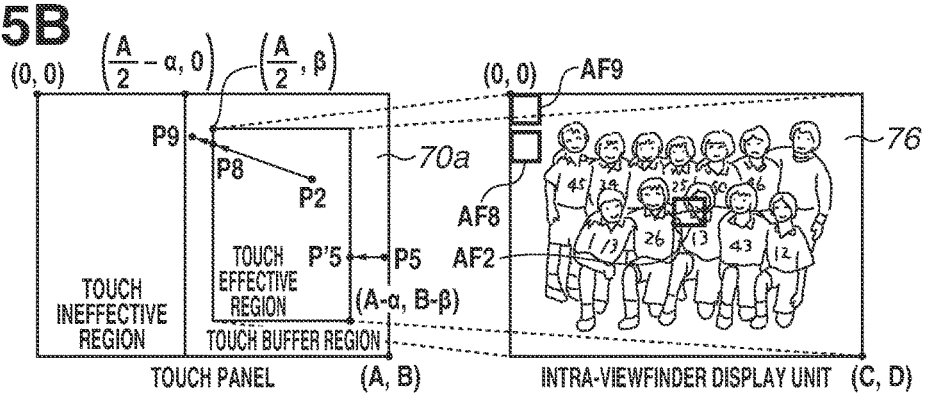

FIG. 5B illustrates a case where the touch effective region has been changed to the right half in step S305, in which the touch effective region ((A/2, $\beta$) to (A–$\alpha$, B–$\beta$)) corresponds to a region ((0, 0) to (C, D)) of the intra-viewfinder display unit 76. More specifically, during the absolute coordinate setting, in a case where the touch input coordinates are (A/2, $\beta$), the coordinates of the intra-viewfinder display unit 76 become (0, 0), and, in a case where the touch input coordinates are (A–$\alpha$, B–$\beta$), the coordinates of the intra-viewfinder display unit 76 become (C, D). During the relative coordinate setting, when the touch input coordinates move by a distance K in the X-axis direction in the touch effective region, an AF frame on the intra-viewfinder display unit 76 moves by $K \times (C/(A-\alpha-(A/2)))$.

Figure 5C:
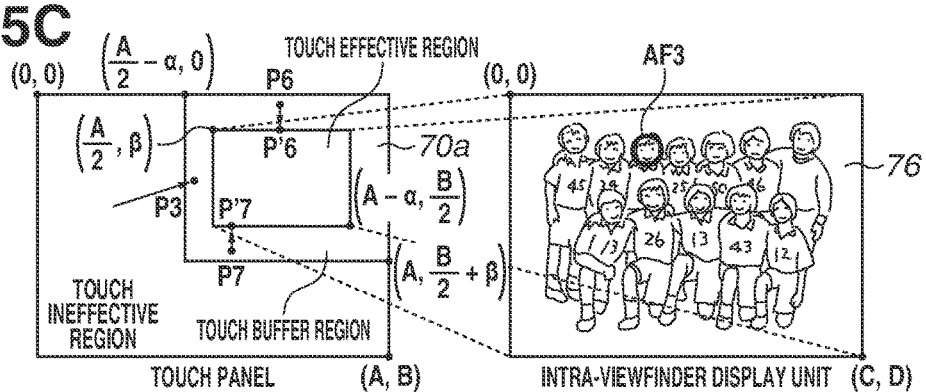

FIG. 5C illustrates a case where the touch effective region has been changed to the upper right in step S305, in which the touch effective region ((A/2, $\beta$) to (A–$\alpha$, B/2)) corresponds to a region ((0, 0) to (C, D)) of the intra-viewfinder display unit 76. More specifically, during the absolute coordinate setting, in a case where the touch input coordinates are (A/2, $\beta$), the coordinates of the intra-viewfinder display unit 76 become (0, 0), and, in a case where the touch input coordinates are (A–$\alpha$, B/2), the coordinates of the intra-viewfinder display unit 76 become (C, D). During the relative coordinate setting, when the touch input coordinates move by a distance K in the X-axis direction in the touch effective region, an AF frame on the intra-viewfinder display unit 76 moves by $K \times (C/(A-\alpha-(A/2)))$.

If the touch effective region is set wide, although it becomes easy to finely set the coordinates, since, when the user is looking through the viewfinder 16, the face of the user is close to the touch panel 70a, the user's finger can hardly enter a space between the user's face and the touch panel 70a, so that it becomes difficult to perform a touch operation. Accordingly, the user can hardly move the touch position to a region where it is difficult to perform a touch operation, and, in the case of the absolute coordinate setting, it becomes difficult to display an AF frame at coordinates corresponding to the region close to the face. Therefore, confining the touch effective region to regions that the user can easily touch, as illustrated in FIGS. 5B and 5C, enables the user to easily select intended coordinates on the intra-viewfinder display unit 76 even when looking through the viewfinder 16.

In step S307, the system control unit 50 sets a touch buffer region. The touch buffer region is a region provided in such a way as to surround the touch effective region as described above. In a case where the touch effective region is set to the entire area as illustrated in FIG. 5A, the touch buffer region includes coordinates of $0 \leq x < \alpha$, $A-\alpha < x \leq A$, $0 \leq y < \beta$, and $B-\beta < y \leq B$. In a case where the touch effective region is set to the right half area as illustrated in FIG. 5B, the touch buffer region includes coordinates of $A/2-\alpha \leq x < A/2$, $A-\alpha < x \leq A$, $0 \leq y < \beta$, and $B-\beta < y \leq B$. In a case where the touch effective region is set to the upper right area as illustrated in FIG. 5C, the touch buffer region includes coordinates of $A/2-\alpha \leq x < A/2$, $A-\alpha < x \leq A$, $0 \leq y < \beta$, and $B/2 < y \leq B/2+\beta$.

When a touch is performed at the touch buffer region, the touch input coordinates are corrected (clipped) to coordinates closest thereto in both the X-axis direction and the Y-axis direction in the touch effective region. If the user unintentionally moves the touch position from the touch effective region to a region unavailable for accepting a touch operation (the touch ineffective region or a region outside the edge of the touch panel 70a, in which a touch operation is not accepted), regardless of the fact that the user intends to move the touch position, it may be determined that the user has released the touch. Since, when looking through the viewfinder 16, the user cannot easily recognize the touch position accurately, the user may unintentionally move the touch position to a region unavailable for accepting a touch operation. Therefore, if a touch buffer region which surrounds the touch effective region is provided, since, even when the touch position moves to outside the touch effective region, the touch position does not immediately move to the touch ineffective region, it is not determined that the user has suddenly unintentionally released the touch.

When the AF setting change is performed by a touch operation during viewfinder access, the movement of the touch position to the touch ineffective region or the touch-up (touch release) in the touch effective region or the touch buffer region serves as a setting instruction for the touch position. Therefore, providing a touch buffer region enables the AF position to become unlikely to be set to a position unintended by the user. Furthermore, if the touch effective region is set to not the entire area of the touch panel 70a but a partial area thereof, operability obtained when the user is looking through the viewfinder 16 is improved as described above in step S306. However, it becomes difficult to find a boundary between the touch effective region and the touch ineffective region.

If the user carefully performs an operation in such a manner that the touch position does not move from the touch effective region to the touch ineffective region or the user performs an operation only at a central portion of the touch effective region in such a manner that the touch position does not reach the very edge of the touch effective region, operability decreases. Therefore, a touch buffer region is provided. In a case, for example, where the touch effective region is a right half area or an upper right area, if all of the areas other than the touch effective region of the touch panel 70a are set as the touch buffer region, the possibility of processing caused by an unintended touch being performed becomes high.

When the user is looking through the viewfinder 16, a part of the user's face, such as the user's nose or cheek, is likely to touch a portion of the touch panel 70a, and, if the touch buffer region is set large, the AF frame can be moved by a touch with, for example, the user's nose. Therefore, it is desirable that the touch buffer region be provided between the touch ineffective region and the touch effective region.

In step S308, the system control unit 50 determines whether to end the shooting mode processing. The shooting mode processing ends by, for example, switching to the playback mode or powering OFF of the digital camera 100. If it is determined to end the shooting mode processing (YES in step S308), the shooting mode processing ends, and, if not (NO in step S308), the processing proceeds to step S309.

In step S309, the system control unit 50 determines whether the eyepiece sensor 77 located in the viewfinder 16 has detected access of an object (access of the user's eye). If it is determined that the eyepiece sensor 77 has detected access of an object (YES in step S309), the processing proceeds to step S310, and, if not (NO in step S309), the processing proceeds to step S331. In a case where the result of determination in step S309 is NO, when an LV image is being displayed on the intra-viewfinder display unit 76 (when an LV image has been displayed in step S310 performed one cycle or more before), displaying is switched to the display unit 28. The AF setting change that is performed by a touch operation during viewfinder access becomes enabled when the eyepiece sensor 77 detects that the user is going to look through the viewfinder 16 and displaying is switched from the display unit 28 to the intra-viewfinder display unit 76.

In step S310, the system control unit 50 displays a live view image on the intra-viewfinder display unit 76. At this time, while displaying of a live view image on the display unit 28 is turned off at the same time that a live view image is displayed on the intra-viewfinder display unit 76, at least in a case where the AF setting change that is performed by a touch operation during viewfinder access is enabled, the display unit 28 can accept a touch operation.

In step S311, the system control unit 50 determines whether the AF setting change that is performed by a touch operation during viewfinder access, which has been set in step S303, is still enabled. If it is determined that the AF setting change that is performed by a touch operation during viewfinder access is still enabled (YES in step S311), the processing proceeds to step S312, and if not (NO in step S311), the processing returns to step S302.

In step S312, the system control unit 50 determines whether "touch-down" onto the touch panel 70a has been performed. If it is determined that "touch-down" onto the touch panel 70a has been performed (YES in step S312), the processing proceeds to step S313, and, if not (NO in step S312), the processing returns to step S302. In step S313, the system control unit 50 acquires a touch position on the touch panel 70a of the "touch-down" detected in step S312, and records the acquired touch position as "(X0, Y0)" in the system memory 52.

In step S314, the system control unit 50 determines whether the touch position of the "touch-down" detected in step S312 is in the touch effective region. If it is determined that the touch position is in the touch effective region (YES in step S314), the processing proceeds to step S315, and, if not (NO in step S314), the processing proceeds to step S316. If, in step S314, it is determined that the touch position is in the touch effective region, the system control unit 50 records the coordinates of the current touch position in the system memory 52.

In step S315, the system control unit 50 acquires display coordinates on the intra-viewfinder display unit 76 based on the "touch-down" detected in step S312. In a case where the processing proceeds to step S315 via the result of determination in step S314 being YES (touch effective region), while, during the absolute coordinate setting, the touch position coordinates and the display coordinates are associated with each other, during the relative coordinate setting, the display coordinates correspond to an AF position set immediately before (are not associated with the touch position). For example, referring to FIG. 5A, during the absolute coordinate setting, when the touch position coordinates are P1=(x1, y1), the display coordinates AF1 on the intra-viewfinder display unit 76 are $(X, Y)=((x1-\alpha) \times C/(A-\alpha-\alpha), ((y1-\beta) \times D/(B-\beta-\beta))$. Referring to FIG. 5B, during the relative coordinate setting, irrespective of the touch position, the display coordinates are an AF position set immediately before on the intra-viewfinder display unit 76 (for example, the position AF2, which is not associated with the position P2).

However, even during the relative coordinate setting, in a case where the AF position is not yet set (in the case of an initial position), when "touch-down" is performed, the AF frame is displayed at the central position irrespective of the touch position. In a case where the processing proceeds to step S315 via the result of determination in step S316 being YES (touch buffer region), while, during the absolute coordinate setting, the corresponding coordinates subjected to clip processing in step S317 and the display coordinates are associated with each other, during the relative coordinate setting, the display coordinates correspond to an AF position set immediately before.

In step S316, the system control unit 50 determines whether the touch position of the "touch-down" detected in step S312 is in the touch buffer region. If it is determined that the touch position is in the touch buffer region (YES in step S316), the processing proceeds to step S317, and, if not (NO in step S316), the processing proceeds to step S318.

In step S317, the system control unit 50 performs clip processing for correcting the touch position in the touch buffer region to coordinates in the touch effective region. The clip processing is described below with reference to FIG. 4. The clip processing is performed to correct the touch position coordinates to the position of an edge of the touch effective region. The system control unit 50 records the coordinates obtained by correcting the touch position coordinates in the system memory 52.

In step S318, since it is determined that the touch position of the "touch-down" detected in step S312 is in the touch ineffective region, the system control unit 50 makes the touch ineffective and does not perform processing corresponding to the "touch-down" (displaying of the AF frame). In a case where the touch is made ineffective, an indication mark indicating that the touch is performed is not displayed. When, after the "touch-down" onto the touch ineffective region, the touch position moves to the touch buffer region or the touch effective region, the AF frame becomes displayed. Even if "touch-down" is performed onto the touch ineffective region and then "touch-up" is performed, the setting of the AF position is not changed. However, in a case where the touch position moves to the touch ineffective region after "touch-down" is performed onto the touch effective region or the touch buffer region, a result of determination in step S324 becomes NO, so that the AF position is set.

In step S319, the system control unit 50 displays the AF frame at the display coordinates on the intra-viewfinder display unit 76 acquired in step S315. During the absolute coordinate setting, the system control unit 50 displays the AF frame at the display coordinates on the intra-viewfinder display unit 76 corresponding to the touch position coordinates of the "touch-down" or the coordinates corrected by the clip processing.

In a case where "touch-down" is performed onto the touch effective region, if the touch effective region is the entire area as illustrated in FIG. 5A, when the touch-down point is point P1, the AF frame is displayed at a position AF1. In a case where "touch-down" is performed onto the touch buffer region, if the touch effective region is the entire area as illustrated in FIG. 5A, when the touch-down point is point P4, the AF frame is displayed at a position AF4.

Since a touch is performed onto the touch buffer region, the "touch-down" point P4 is corrected by the clip processing to an edge of the touch effective region (P'4), and, then, the AF frame is displayed at the display coordinates (AF4) on the intra-viewfinder display unit 76 corresponding to the corrected coordinates. In a case where the touch position moves to the touch buffer region after "touch-down" is performed onto the touch ineffective region illustrated in FIG. 5B or 5C, the AF frame is displayed at the display coordinates corresponding to the coordinates corrected at the time of arrival at the touch buffer region.

During the relative coordinate setting, the AF frame is displayed at the AF position set immediately before (the position not corresponding to the touch position coordinates). When "touch-down" is performed onto the touch effective region (for example, point P2), if the touch effective region is the right half area as illustrated in FIG. 5B, the AF frame is displayed at the position AF2, which is the central position on the intra-viewfinder display unit 76. Even when "touch-down" is performed onto the touch buffer region, the AF frame is displayed at the position AF2.

In a case where "touch-down" is performed onto the touch ineffective region, when the touch position moves from the touch ineffective region and then arrives at point P3 in the touch buffer region as illustrated in FIG. 5C, the AF frame is displayed at the AF position set immediately before at the time of arrival at the touch buffer region. An indication AF3 illustrated in FIG. 5C indicates an AF frame that is currently set, and is displayed in response to the touch position moving from the touch ineffective region to the touch buffer region. Thus, during the relative coordinate setting, the AF frame is displayed in response to the touch position moving to the point P3 in the touch buffer region.

In step S320, the system control unit 50 determines whether the movement of the touch position has been performed. If it is determined that the movement of the touch position has been performed (YES in step S320), the processing proceeds to step S321, and, if not (NO in step S320), the processing proceeds to step S328.

In step S321, as with step S313, the system control unit 50 acquires the touch position coordinates, and records the acquired touch position coordinates as "(Xn, Yn)" in the system memory 52. In a case where the system control unit 50 has already acquired the touch position coordinates in step S321 performed one cycle before, the system control unit 50 records the touch position coordinates set immediately before acquired one cycle before as "(X(−1), Y(n−1))". After acquiring the touch position coordinates in step S321, the system control unit 50 can determine whether the movement of the touch position has been performed by comparing the acquired touch position coordinates with the touch position coordinates set immediately before in step S320. In step S322, the system control unit 50 performs processing similar to that in step S314.

In step S323, the system control unit 50 acquires display coordinates. In the case of the absolute coordinate setting, the display coordinates are the touch position coordinates acquired in step S321 or the position corresponding to the coordinates obtained by correcting the touch position coordinates in step S325. Referring to FIG. 5A, even if the touch position moves from point P1 to point P4, the position corresponding to point P'4 obtained by correction becomes the display coordinates. In the case of the relative coordinate setting, the position of the AF frame having moved according to the movement of the touch position from the position displayed before processing in step S323 becomes the display coordinates.

The movement distance of the touch position is obtained by comparing the touch position coordinates (Xn, Yn) acquired in step S321 immediately before with the coordinates (X0, Y0) in a case where the processing proceeds to step S323 for the first time after processing in step S315 or with the coordinates (X(n−1), Y(n−1)) in an otherwise case. In a case where a touch is performed onto the touch buffer region, since the touch position coordinates are subjected to the clip processing, the movement distance of the touch position is obtained not based on the distance of the actual movement of the touch position but by comparing the current touch position coordinates with the corrected coordinates.

In step S324, the system control unit 50 determines whether the touch position obtained after it is determined that the touch position has moved in step S320 is in the touch buffer region. If it is determined that the touch position is in the touch buffer region (YES in step S324), the processing proceeds to step S325, and, if not (NO in step S324), the processing proceeds to step S326. Processing in step S325 is clip processing similar to that in step S317, which is described below with reference to FIG. 4.

In step S326, the system control unit 50 sets the AF position. In a case where the processing proceeds to step S326 via results of determination in steps S322 and S324 being NO, since the touch position has moved to the touch ineffective region, the system control unit 50 sets the AF position based on the position at which the AF frame has been displayed immediately before the touch position moves to the touch ineffective region. In a case where the processing proceeds to step S326 via a result of determination in step S328 being YES, since the user has released the touch in the touch effective region or the touch buffer region, the system control unit 50 sets the AF position based on the position of the AF frame obtained when the user has released the touch.

In the case of face tracking AF, when an AF frame (an index frame) is displayed at the position at which a touch has been performed and the AF frame is moved to the position at which a face has been detected, the frame sticks to the position of the face and the display format of the frame changes to a face detection frame (for example, an orange double-line frame). When the touch is released or the touch position moves to the touch ineffective region, tracking is started with respect to a subject in the face detection frame (after processing for determining a tracking object is performed), and the display format of the face detection frame changes to a tracking frame (for example, a black double-line frame).

Even when the position of the AF frame obtained when the touch is released or the touch position moves to the touch ineffective region is not the position of a face, a subject to be tracked is determined based on, for example, the color or contrast of the position of the AF frame according to "touch-up" or "touch-move" to the touch ineffective region, and, then, tracking is started. In the case of 1-point AF (smooth zone AF), the AF frame moves based on the position at which a touch has been performed, and a position at which AF is performed is also changed according to the movement of the AF frame. In step S327, the system control unit 50 displays the AF frame at the display coordinates acquired in step S323.

In the case of the absolute coordinate setting, for example, if the touch position moves from point P1 to point P4 illustrated in FIG. 5A, the display coordinates becomes point P'4 as described in step S323. After the touch position arrives at the edge of the touch effective region in the X-axis direction during the process of movement of the touch position, the AF frame remains displayed at the edge in the X-axis direction, so that the user can recognize that the user is touching a region other than the touch effective region. In other words, the user can recognize that, if the touch position continues being moved, the touch position might move to the touch ineffective region (in the case of FIG. 5A, to outside the touch panel 70a).

In the case of the relative coordinate setting, for example, if the touch position moves from point P2 to point P8 and further to point P9 illustrated in FIG. 5B, the position of the AF frame moves from the position AF2 to the position AF8 and further to the position AF9. Despite the fact that the user is moving the touch position in the X-axis minus direction and the Y-axis minus direction, the AF frame becomes moving only in the Y-axis direction on the way (from the position AF8 to the position AF9). Until the touch position moves from point P2 to point P8, which is the position of the edge of the touch effective region, the AF frame also moves from the position AF2 to the position AF8 based on the movement of the touch position.

When the touch position moves from point P8 to the touch buffer region, even if the touch position moves in the X-axis direction, the X coordinate of the touch position is corrected to the X coordinate of the edge of the touch effective region (the same X coordinate as that of point P8). Therefore, the X-axis coordinate of the display coordinates remains unchanged, and, even when the touch position moves from point P8 in the X-axis direction, the AF frame does not move in the X-axis direction but move only in the Y-axis direction (from the position AF8 to the position AF9).

Since, although the user is moving the touch position not only in the X-axis direction but also in the Y-axis direction, the AF frame moves only in the Y-axis direction, the user can recognize that the touch is not in an effective region with respect to the touch position in the X-axis direction. Therefore, the user can recognize that, if the user continues moving the touch position, the touch position would move to the touch ineffective region. Since providing the touch buffer region enables the user to find that the touch position is moving from the touch effective region, the possibility that the touch position suddenly moves to the touch ineffective region and the AF position is set in an unintended manner, as described in step S326, becomes low. In particular, in the case of face tracking AF, since tracking is started when it is determined that the touch moves away from the touch effective region, if tracking starts with respect to an unintended subject, an unintended shooting result can be produced. While the user is going to re-set a subject to be tracked, a shooting opportunity can be missed.

In step S328, the system control unit 50 determines whether the touch has been released from the touch panel 70a (the touch effective region or the touch buffer region). If it is determined that the touch has been released from the touch panel 70a (YES in step S328), the processing proceeds to step S326, and, if not (NO in step S328), then in step S320, the system control unit 50 determines whether the movement of the touch position has been performed.

In step S329, the system control unit 50 determines whether a shooting instruction has been issued. The shooting instruction can be issued by the shutter button 61 being pressed. In response to generation of a first shutter switch signal SW1 caused by the half-press of the shutter button 61, the system control unit 50 performs AF processing at the AF position set in step S326. Then, in step S330, in response to generation of a second shutter switch signal SW2 caused by the full-press of the shutter button 61, the system control unit 50 records a captured image on the recording medium 200.

In step S331, the system control unit 50 determines whether the "touch-down" to the touch panel 70a has been detected. If it is determined that the "touch-down" has been detected (YES in step S331), the processing proceeds to step S332, and, if not (NO in step S331), the processing returns to step S301. Processing in steps S331 to S335 is processing performed when the access of the user's eye is not detected in step S309, and is processing performed when a live view image is displayed on the display unit 28 and the user is performing an operation on the touch panel 70a while viewing the display unit 28. In step S332, the system control unit 50 acquires the touch position coordinates on the touch panel 70a at which the touch-down has been performed in step S331.

Figure 5D:
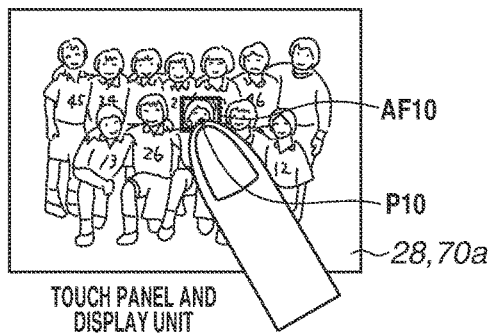

In step S333, the system control unit 50 displays an AF frame at the touch position coordinates acquired in step S332, which is the position on the display unit 28 at which the "touch-down" has been performed. When the user performs "touch-down" onto the display unit 28, the AF frame is displayed below the user's finger with which the "touch-down" has been performed. FIG. 5D illustrates the behaviors of the display unit 28 and the touch panel 70a, in which an AF frame is displayed at the position that the user has touched (point P10, i.e., the position AF10).

Figure 4:
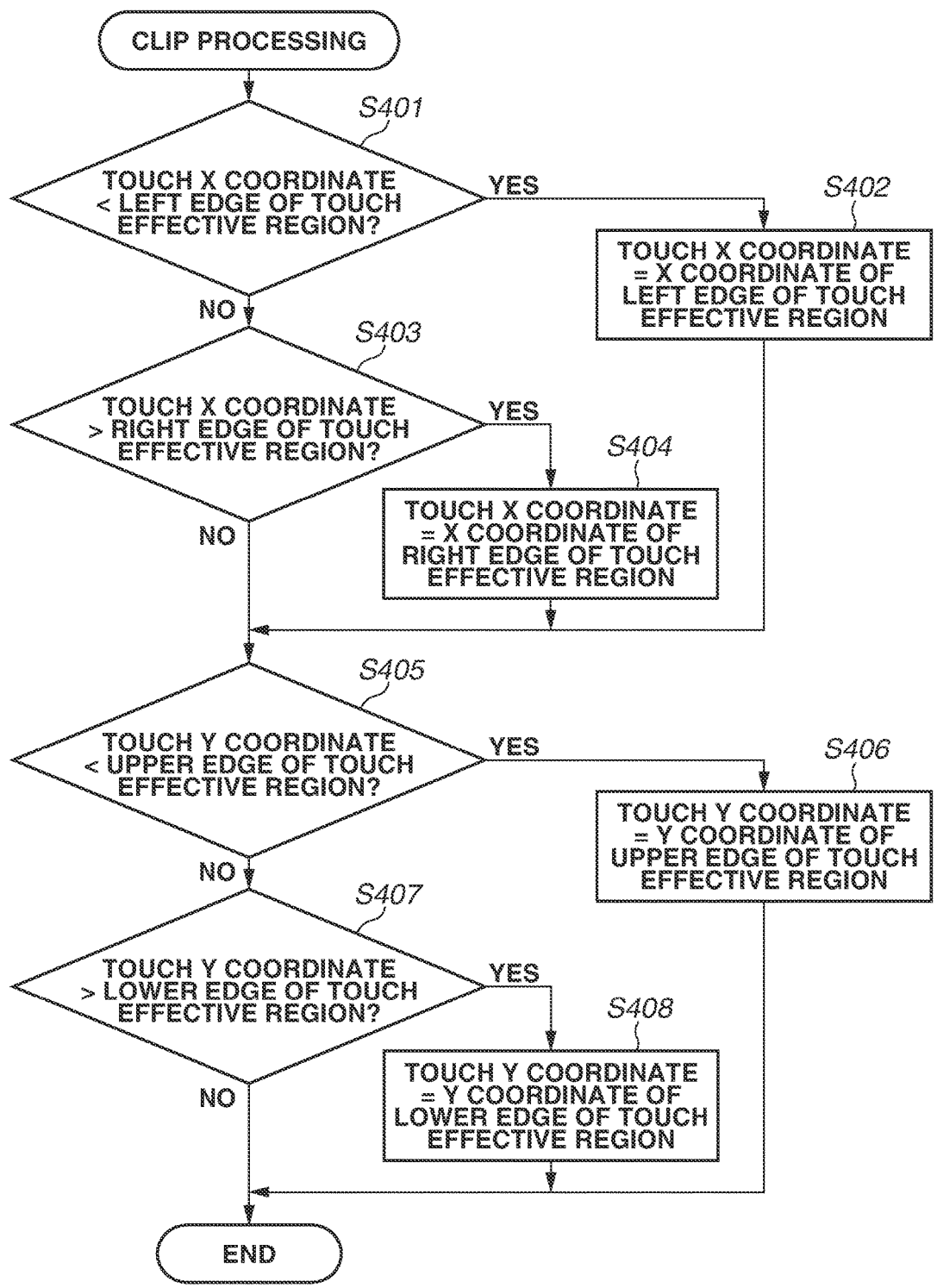
FIG. 4 is a flowchart illustrating clip processing in the exemplary embodiment.

In a case where there is no access of the user's eye, the correction of the touch position coordinates such as that described below with reference to FIG. 4 is not performed.

More specifically, even when the X ordinate of the touch position coordinates is in a region closer to the right than the right edge of the touch effective region, such as those illustrated in FIGS. 5A to 5C, the system control unit 50 does not correct the X ordinate of the touch position coordinates to the right edge of the touch effective region and displays an AF frame at the position that the user has touched. Thus, in a case where there is no access of the user's eye, even if a touch is performed at a position where the touch position would be corrected when a touch is performed during access of the user's eye, the system control unit 50 does not correct the touch position coordinates and displays an AF frame directly at the position that the user has touched.

In step S334, the system control unit 50 determines whether the touch has been released from the touch panel 70a. If it is determined that the touch has been released (YES in step S334), the processing proceeds to step S335, and, if not (NO in step S334), the processing proceeds to step S332. Until the touch is released, the system control unit 50 acquires the touch position coordinates in step S332 and displays an AF frame based on the touch position coordinates. In step S335, the system control unit 50 sets the AF position at the position where the AF frame has been displayed. This processing is similar to that performed in step S326.

As described above, according to the above-described exemplary embodiment, even when the touch position moves away from the touch effective region, unintended processing can be prevented from being performed. Even if the touch position is unintentionally moved away from the touch effective region, the touch position does not immediately move to the touch ineffective region and the touch is thus performed on the touch buffer region. Therefore, the AF position is not set at an unintended position in response to the touch position moving away from the touch effective region. Since the touch position in the touch buffer region is corrected, before the touch position moves to the touch ineffective region, the user can recognize that the touch position has moved from the touch effective region by viewing the behavior of movement of the AF frame.

Next, the clip processing is described with reference to FIG. 4. This processing is implemented by the system control unit 50 loading a program recorded in the nonvolatile memory 56 into the system memory 52 and executing the program. This processing is started when the shooting mode processing illustrated in FIG. 3 proceeds to step S317.

In step S401, the system control unit 50 determines whether the X coordinate of the touch position coordinates acquired in step S313 or S321 is smaller than the X coordinate of the left edge of the touch effective region. In other words, the system control unit 50 determines whether the user has touched a touch buffer region on the left side as viewed from the touch effective region. If it is determined that the X coordinate of the touch position coordinates is smaller than the X coordinate of the left edge of the touch effective region (YES in step S401), the processing proceeds to step S402, and, if not (NO in step S401), the processing proceeds to step S403.

In step S402, the system control unit 50 corrects and sets the X coordinate of the touch position coordinates to the X coordinate of the left edge of the touch effective region. In a case where the touch position coordinates on the touch panel 70a are point P4 (x4, y4) illustrated in FIG. 5A, the X coordinate of point P4 is located closer to the left side than the left edge of the touch effective region, so that a result of determination in step S401 becomes YES. Therefore, in step S402, point P4 (x4, y4) is corrected to point P'4 ($\alpha$, y4). When the X coordinate of the touch position coordinates is in the range of "0≤x4<$\alpha$", "x4=$\alpha$" results.

In step S403, the system control unit 50 determines whether the X coordinate of the touch position coordinates acquired in step S313 or S321 is larger than the X coordinate of the right edge of the touch effective region. In other words, the system control unit 50 determines whether the user has touched a touch buffer region on the right side as viewed from the touch effective region. If it is determined that the X coordinate of the touch position coordinates is larger than the X coordinate of the right edge of the touch effective region (YES in step S403), the processing proceeds to step S404, and, if not (NO in step S403), the processing proceeds to step S405.

In step S404, the system control unit 50 corrects and sets the X coordinate of the touch position coordinates to the X coordinate of the right edge of the touch effective region. In a case where the touch position coordinates on the touch panel 70a are point P5 (x5, y5) illustrated in FIG. 5B, the X coordinate of point P5 is located closer to the right side than the right edge of the touch effective region, so that a result of determination in step S403 becomes YES. Therefore, in step S404, point P5 (x5, y5) is corrected to point P'5 (A–$\alpha$, y5). When the X coordinate of the touch position coordinates is in the range of "A–$\alpha$<x5<A", "x5=A–$\alpha$" results.

In step S405, the system control unit 50 determines whether the Y coordinate of the touch position coordinates acquired in step S313 or S321 is smaller than the Y coordinate of the upper edge of the touch effective region. In other words, the system control unit 50 determines whether the user has touched a touch buffer region on the upper side as viewed from the touch effective region. If it is determined that the Y coordinate of the touch position coordinates is smaller than the Y coordinate of the upper edge of the touch effective region (YES in step S405), the processing proceeds to step S406, and, if not (NO in step S405), the processing proceeds to step S407.

In step S406, the system control unit 50 corrects and sets the Y coordinate of the touch position coordinates to the Y coordinate of the upper edge of the touch effective region. In a case where the touch position coordinates on the touch panel 70a are point P6 (x6, y6) illustrated in FIG. 5C, the Y coordinate of point P6 is located closer to the upper side than the upper edge of the touch effective region, so that a result of determination in step S405 becomes YES. Therefore, in step S406, point P6 (x6, y6) is corrected to point P'6 (x6, $\beta$). When the Y coordinate of the touch position coordinates is in the range of "0≤y6<$\beta$", "y6=$\beta$" results.

In step S407, the system control unit 50 determines whether the Y coordinate of the touch position coordinates acquired in step S313 or S321 is larger than the Y coordinate of the lower edge of the touch effective region. In other words, the system control unit 50 determines whether the user has touched a touch buffer region on the lower side as viewed from the touch effective region. If it is determined that the Y coordinate of the touch position coordinates is larger than the Y coordinate of the lower edge of the touch effective region (YES in step S407), the processing proceeds to step S408, and, if not (NO in step S407), the processing ends.

In step S408, the system control unit 50 corrects and sets the Y coordinate of the touch position coordinates to the Y coordinate of the lower edge of the touch effective region. In a case where the touch position coordinates on the touch panel 70a are point P7 (x7, y7) illustrated in FIG. 5C, the Y coordinate of point P7 is located closer to the lower side than the lower edge of the touch effective region, so that a result of determination in step S407 becomes YES. Therefore, in step S408, point P7 (x7, y7) is corrected to point P'7 (x7, B/2). When the Y coordinate of the touch position coordinates is in the range of "B/2<y7≤B/2+β", "y7=B/2" results.

The correction of the touch position coordinates is described with reference to FIG. 5B. While the description is made on the assumption that the touch position input is set to the relative coordinate setting, in the case of the relative coordinate setting, even when the touch is performed across the edge of the touch effective region, the display position of the AF frame is not necessarily located at the edge thereof. Therefore, the association between the touch position and the AF frame is lower than in the case of the absolute coordinate setting, so that it is difficult for the user to accurately grasp whether the user's finger used for touching is going to move away from the touch effective region. However, since a touch buffer region is provided, when the touch position moves away from the touch effective region, the touch position is corrected and the AF frame is prevented from moving in at least one of the X-axis direction and the Y-axis direction, so that the user can recognize that the touch position has moved away from the touch effective region.

As described above, according to the processing illustrated in FIG. 4, the user can recognize in which direction the movement of the touch position is ineffective. Since the coordinates of the touch position in the respective X-axis and Y-axis directions are compared with the coordinates of the edges of the touch effective region in the respective X-axis and Y-axis directions and are corrected based on a result of comparison, if the touch position coordinates are outside the touch effective region, the AF frame does not move even when the touch position moves in the X-axis direction. Therefore, the user can recognize that, while the touch position is not outside the upper or lower edge of the touch effective region (in the Y-axis direction), the touch position is outside the right or left edge of the touch effective region (in the X-axis direction).

While the above-described exemplary embodiment is implemented both in the case of the absolute coordinate setting and in the case of the relative coordinate setting, it can be implemented just in the case of the relative coordinate setting. In the case of the relative coordinate setting, since it is more difficult to grasp whether the touch position is going to move away from the touch effective region even when viewing the position of the AF frame than in the case of the absolute coordinate setting, the above-described exemplary embodiment is more effective.

In a case where the touch position coordinates are in the touch buffer region and the touch position coordinates are thus corrected, the shape or color of an index displayed on the intra-viewfinder display unit 76 can be changed.

During setting of the face tracking AF, an AF frame that indicates a subject that is being tracked and an AF frame that indicates an AF position that is being subjected to setting change are made different from each other in the display format. For example, the AF frame that indicates a subject that is being tracked is set as a frame AF1 illustrated in FIG. 5A, and the AF frame that indicates an AF position that is being subjected to setting change is set as a frame AF3 illustrated in FIG. 5C.

Both when a touch is started from the touch effective region and when a touch is started from the touch ineffective region, if the touch position moves to the touch buffer region, the touch position is corrected and the AF frame is displayed. However, in a case where a touch operation is started from the touch ineffective region and then moves to the touch buffer region, the touch can be made ineffective and the AF frame can be made not to be displayed until the touch operation moves to the touch effective region. The present exemplary embodiment can be applied at the time of setting a position at which to perform automatic exposure (AE) processing or automatic white balance (AWB) processing besides AF processing. For example, in the case of AE processing, in response to the touch being released, AE processing is performed based on a subject about which a frame is displayed.

The above-described exemplary embodiment described an example in which the touch buffer region is provided in such a way as to surround the sides parallel to the X axis of the touch effective region and the sides parallel to the Y axis thereof. The touch buffer region does not necessarily need to be a region provided along the X axis and the Y axis of the touch effective region, and can be a region provided along the sides of the touch effective region.

The above-described exemplary embodiment has been described using the digital camera 100 as an example. However, this not seen to be limiting. Any electronic apparatus that can perform control to move a position at which to perform processing that is based on a designated position, such as displaying of a cursor or changing of a setting value on a bar or a memory, according to an operation performed on a touch sensor different in position from a display unit is applicable. For example, moving a cursor, a selection item, or a selection point using a touch-pad in a notebook computer. Additionally, in another example, drawing a line for graphic expression or selecting a range using a tablet computer.

Thus, the present disclosure can be applied to, for example, a personal computer (PC), a mobile phone terminal, a mobile image viewer, a digital photo frame, a music player, a gaming machine, an electronic book reader, a tablet PC, a smartphone, a projection apparatus, and home electric appliances having a display unit. The present disclosure can also be applied to an apparatus, such as a smartphone, a tablet PC, or a desktop PC, which receives and displays a live view image captured by, for example, a digital camera via wired or wireless communication and remotely controls the digital camera (including a network camera).

The functions of the above-described embodiments can be implemented by supplying software (a program) to a system or apparatus via a network or various recording media, and a computer (or, for example, a central processing unit (CPU) or a micro processing unit (MPU)) of the system or apparatus reads out and executes program code. In this case, the program and a recording medium storing the program each configure the present disclosure.

According to an exemplary embodiment, the possibility of unintended processing being performed due to the touch position moving to a touch ineffective region can be reduced.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-168607 filed Aug. 30, 2016, which is hereby incorporated by reference herein in its entirety.

What is claimed is:

1. An electronic apparatus comprising:
a touch detection unit configured to detect a touch operation on an operation surface, the operation surface including a first region, a third region adjacent to the first region, and a second region adjacent to the third region; and
a control unit configured to perform, when a touch position is moved in the first region, control to move a mark, which is displayed on a display unit different from the operation surface, based on a first component and a second component of movement of the touch position,
wherein the control unit performs control not to move the mark displayed on the display unit when the touch position is moved in the second region of the operation surface, and
wherein the control unit performs control not to move the mark displayed on the display unit based on at least one of the first component and the second component of movement of the touch position when the touch position is moved in the third region.

2. The electronic apparatus according to claim 1, wherein the control unit performs control to display the mark on the display unit in response to a touch being started in the first region and not to display the mark on the display unit when a touch is started in the second region.

3. The electronic apparatus according to claim 1, wherein the control unit performs control to display the mark on the display unit in response to a touch being started in the first region and to perform specific processing based on a position of the mark in response to the touch being released from the first region.

4. The electronic apparatus according to claim 3, wherein the specific processing is autofocus (AF) processing.

5. The electronic apparatus according to claim 3, wherein the specific processing is processing for determining a tracking target or starting of tracking.

6. The electronic apparatus according to claim 3, wherein the specific processing includes at least one of automatic exposure (AE) processing and automatic white balance (AWB) processing.

7. The electronic apparatus according to claim 3, wherein the control unit performs control to perform the specific processing in response to a touch started in the first region moving to the second region, and not to perform, when a touch started in the first region moves to the third region, the specific processing and not to move the mark displayed on the display unit based on movement of the touch position.

8. The electronic apparatus according to claim 1, wherein the third region is a region sandwiched between the first region and the second region.

9. The electronic apparatus according to claim 1, further comprising a correction unit configured to correct at least one of a position in the first component and a position in the second component of a position at which a touch in the third region has been performed to a position of an edge of the first region,
wherein the control unit performs control to display the mark on the display unit based on the position corrected by the correction unit.

10. The electronic apparatus according to claim 1,
wherein the third region is a region located along a side parallel to the first component and a side parallel to the second component, and
wherein the control unit performs control not to move the mark based on movement of the touch position in the second component when the touch position is moved in a region located along a side of the first component of the third region and not to move the mark based on movement of the touch position in the first movement when the touch position is moved in a region located along a side of the second component of the third region.

11. The electronic apparatus according to claim 1,
wherein the display unit is a display unit viewable via a viewfinder, and
wherein the control unit performs control not to display the mark on the display unit when a touch is started on the second region in a case where the mark is displayed on the display unit, and to display the mark on an extra-viewfinder display unit integrally provided with the operation surface and provided outside the viewfinder when a touch is started on the second region in a case where the mark is displayed on the extra-viewfinder display unit.

12. The electronic apparatus according to claim 11, further comprising an access detection unit configured to detect an object accessing the viewfinder including the display unit.

13. The electronic apparatus according to claim 11, wherein the control unit performs control to display the mark on the display unit in response to the touch position moving to the third region after a touch is started in the second region in a case where the mark is displayed on the display unit.

14. The electronic apparatus according to claim 1, wherein the first component and the second component include an X-axis component and a Y-axis component.

15. The electronic apparatus according to claim 1, wherein a captured image acquired by imaging is displayed on the display unit and the mark is displayed while being superimposed on the captured image.

16. The electronic apparatus according to claim 1, further comprising a selection unit configured to enable selecting a size of the first region of the operation surface.

17. The electronic apparatus according to claim 1, wherein the operation surface is provided at a position different from the display unit.

18. The electronic apparatus according to claim 1, wherein the control unit performs control to move the mark displayed on the display unit based on one of the first component and the second component of movement of the touch position when the touch position is moved in the third region.

19. The electronic apparatus according to claim 1, wherein, in response to a touch started in the first region moving to the second region, the control unit makes the touch ineffective.

20. The electronic apparatus according to claim 1, wherein, when a touch started in the first region has been moved from the first region to a portion located in a direction of the first component of the third region, the control unit performs control to move the mark along the second component, without moving the mark along the first component, based on movement of the touch in the first component and the second component at the portion.

21. An electronic apparatus comprising:
an imaging unit;
a touch detection unit configured to detect a touch operation on an operation surface, the operation surface including a first region and a second region adjacent to the first region; and
a control unit configured to perform, when a touch position is moved in the first region, control to move a mark, which is displayed on a display unit different from the operation surface and indicates a position at which to perform processing about imaging, based on a first component and a second component of movement of the touch position and to perform, in response to a touch being released from the first region, the processing based on a position at which the mark is displayed,
wherein the control unit performs control not to move the mark displayed on the display unit based on at least one of the first component and the second component of movement of the touch position when the touch position is moved in the second region of the operation surface.

22. A method for controlling an electronic apparatus including an operation surface, the operation surface including a first region, a third region adjacent to the first region, and a second region adjacent to the third region, the method comprising:
detecting a touch operation on the operation surface; and
performing, when a touch position is moved in the first region, control to move a mark, which is displayed on a display unit different from the operation surface, based on a first component and a second component of movement of the touch position,
performing control not to move the mark displayed on the display unit when the touch position is moved in the second region of the operation surface, and
performing control not to move the mark displayed on the display unit based on at least one of the first component and the second component of movement of the touch position when the touch position is moved in the third region.

23. A method for controlling an electronic apparatus including an imaging unit and an operation surface including a first region and a second region adjacent to the first region, the method comprising:
detecting a touch operation on an operation surface; and
performing, when a touch position is moved in the first region, control to move a mark, which is displayed on a display unit different from the operation surface and indicates a position at which to perform processing about imaging, based on a first component and a second component of movement of the touch position,
performing, in response to a touch being released from the first region, the processing based on a position at which the mark is displayed, and
performing control not to move the mark displayed on the display unit based on at least one of the first component and the second component of movement of the touch position when the touch position is moved in the second region of the operation surface.

24. A non-transitory computer-readable storage medium storing a program that, when executed by a computer, causes the computer to execute a method for controlling an electronic apparatus including an operation surface, the operation surface including a first region, a third region adjacent to the first region, and a second region adjacent to the third region, the method comprising:
detecting a touch operation on the operation surface; and
performing, when a touch position is moved in the first region, control to move a mark, which is displayed on a display unit different from the operation surface, based on a first component and a second component of movement of the touch position,
performing control not to move the mark displayed on the display unit when the touch position is moved in the second region of the operation surface, and
performing control not to move the mark displayed on the display unit based on at least one of the first component and the second component of movement of the touch position when the touch position is moved in the third region.

25. A non-transitory computer-readable storage medium storing a program that, when executed by a computer, causes the computer to execute a method for controlling an electronic apparatus including an imaging unit and an operation surface including a first region and a second region adjacent to the first region, the method comprising:
detecting a touch operation on an operation surface; and
performing, when a touch position is moved in the first region, control to move a mark, which is displayed on a display unit different from the operation surface and indicates a position at which to perform processing about imaging, based on a first component and a second component of movement of the touch position,
performing, in response to a touch being released from the first region, the processing based on a position at which the mark is displayed, and
performing control not to move the mark displayed on the display unit based on at least one of the first component and the second component of movement of the touch position when the touch position is moved in the second region of the operation surface.

* * * * *